United States Patent
Agarwala et al.

(10) Patent No.: US 7,574,586 B2
(45) Date of Patent: Aug. 11, 2009

(54) EFFICIENT TRANSFER OF BRANCH INFORMATION

(75) Inventors: Manisha Agarwala, Richardson, TX (US); John M. Johnsen, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 17 days.

(21) Appl. No.: 11/383,688

(22) Filed: May 16, 2006

(65) Prior Publication Data

US 2007/0271447 A1 Nov. 22, 2007

(51) Int. Cl.
*G06F 9/00* (2006.01)

(52) U.S. Cl. .................... 712/227; 712/233

(58) Field of Classification Search .......... 712/227, 712/233
See application file for complete search history.

(56) References Cited

U.S. PATENT DOCUMENTS

| | | | | |
|---|---|---|---|---|
| 5,381,533 A * | 1/1995 | Peleg et al. | ............ | 712/215 |
| 5,546,390 A * | 8/1996 | Stone | ............ | 370/408 |
| 5,564,028 A * | 10/1996 | Swoboda et al. | ............ | 712/227 |
| 5,794,028 A * | 8/1998 | Tran | ............ | 712/240 |
| 5,835,754 A * | 11/1998 | Nakanishi | ............ | 712/239 |
| 5,903,751 A * | 5/1999 | Hoyt et al. | ............ | 712/238 |
| 5,978,909 A * | 11/1999 | Lempel | ............ | 712/240 |
| 6,014,742 A * | 1/2000 | Krick et al. | ............ | 712/236 |
| 6,173,395 B1 * | 1/2001 | Wisor et al. | ............ | 712/236 |
| 6,175,914 B1 * | 1/2001 | Mann | ............ | 712/227 |
| 6,351,844 B1 * | 2/2002 | Bala | ............ | 717/128 |
| 6,658,557 B1 * | 12/2003 | McCoy et al. | ............ | 712/227 |
| 7,024,545 B1 * | 4/2006 | Zuraski et al. | ............ | 712/240 |
| 2003/0051122 A1* | 3/2003 | Sato | ............ | 712/227 |
| 2004/0117717 A1* | 6/2004 | Swoboda | ............ | 714/776 |
| 2004/0139281 A1* | 7/2004 | McDonald | ............ | 711/133 |

* cited by examiner

*Primary Examiner*—Eddie P Chan
*Assistant Examiner*—Idriss N Alrobaye
(74) *Attorney, Agent, or Firm*—Wade J. Brady, III; Frederick J. Telecky, Jr.

(57) ABSTRACT

A system comprising a processor adapted to execute software code comprising branch instructions and a trace logic coupled to the processor and adapted to generate a branch packet comprising branch bits. At least some of the branch bits are associated with branch instructions executed by the processor. The trace logic flushes invalid branch bits in the branch packet with a common bit, the common bit an inverse of a valid branch bit. The trace logic outputs the branch packet with an indicator comprising the valid branch bit.

12 Claims, 6 Drawing Sheets

EFFICIENT TRANSFER OF BRANCH INFORMATION

CROSS-REFERENCE TO RELATED APPLICATIONS

This application contains subject matter which may relate to commonly-owned, co-pending application entitled, "Efficient Transfer of Timing Information," filed May 16, 2006 and incorporated herein by reference.

BACKGROUND

A software developer may use debugging software running on a host computer to test and debug an application stored on hardware coupled to the host computer. While the application is being tested and debugged, various information is transferred from the hardware to the host computer. Improvements that increase the efficiency of such information transfers are desirable.

SUMMARY

The problems noted above are solved in large part by techniques for efficient transfer of branch information. An illustrative embodiment comprises a system comprising a processor adapted to execute software code comprising branch instructions and a trace logic coupled to the processor and adapted to generate a branch packet comprising branch bits. At least some of the branch bits are associated with branch instructions executed by the processor. The trace logic flushes invalid branch bits in the branch packet with a common bit, the common bit an inverse of a valid branch bit. The trace logic outputs the branch packet with an indicator comprising the valid branch bit.

Another illustrative embodiment includes method comprising generating a branch packet comprising branch bits, at least some of the branch bits associated with branch instructions executed by a processor. The method also comprises flushing invalid branch bits in the branch packet with a common bit, the common bit being an inverse of a valid branch bit in the branch packet. The method further comprises providing to another processor the branch packet and an indicator comprising the valid branch bit.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
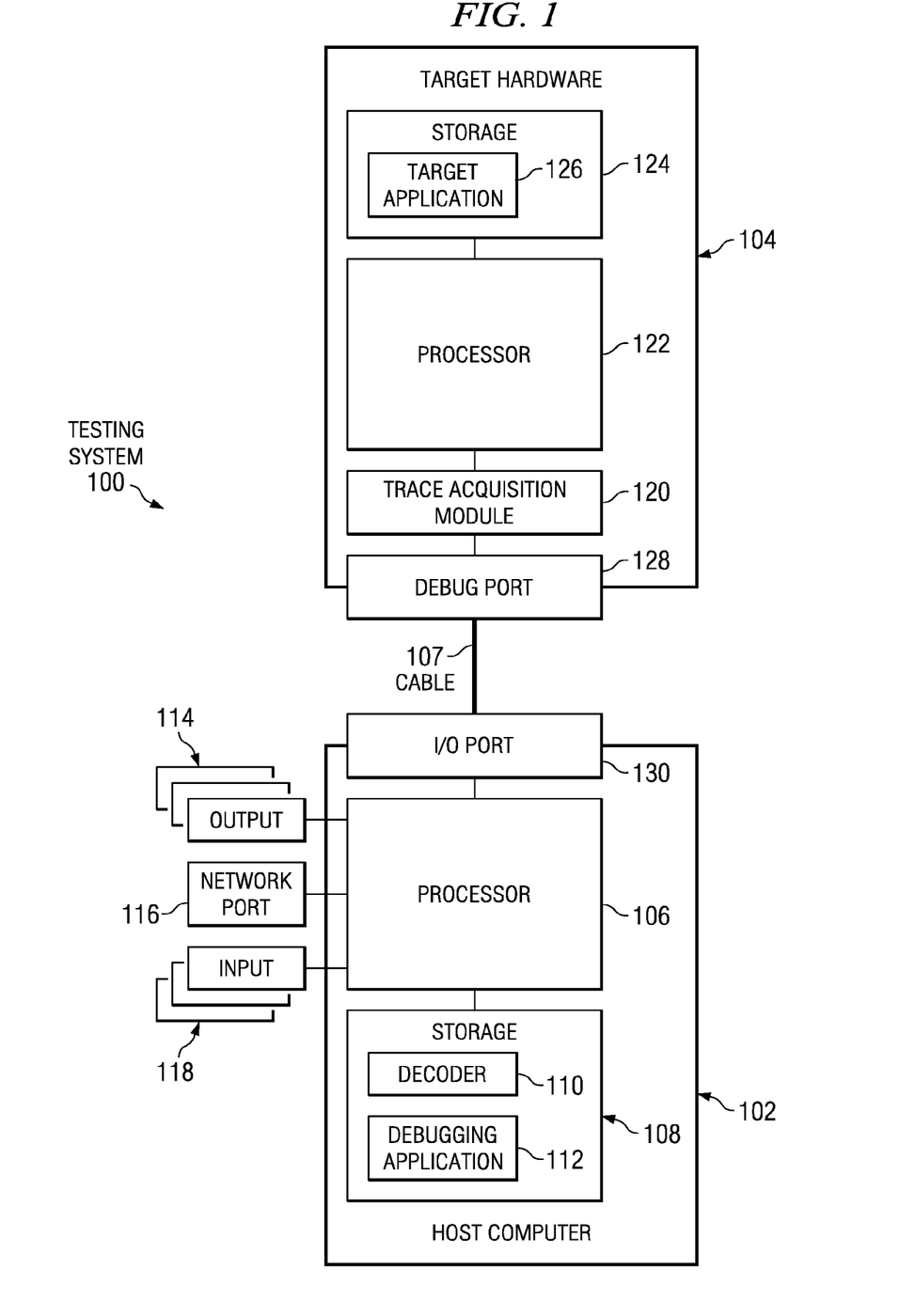
FIG. 1 shows a block diagram of a testing system in accordance with embodiments of the invention.

FIG. 1 shows an illustrative testing system 100 in accordance with embodiments of the invention. The testing system 100 comprises a general purpose host computer 102 and target hardware 104 coupled via a cable 107. The cable 107 couples the input/output (I/O) port 130 of the host computer 102 with the debug port 128 of the target hardware 104. In at least some embodiments, the debug port 128 may include a Joint Test Action Group (JTAG) port, although the scope of disclosure is not limited as such. In some embodiments, the target hardware 104 may be, or may be incorporated into, a mobile communication device such as a mobile phone, a personal digital assistant (e.g., a BLACKBERRY® device), or other type of electronic system. The target hardware 104 and the host computer 102 are now described in turn.

In some embodiments, the target hardware 104 comprises a megacell or a system-on-chip (SoC) which includes a control logic such as a processor 122 (e.g., digital signal processor (DSP)) and a storage 124 (e.g., random access memory (RAM)). The storage 124 stores one or more target applications 126 (e.g., embedded applications) which, when executed by the processor 122, perform any suitable function associated with the target hardware 104. As described further below, the host computer 102 is used to test and/or debug the one or more target applications 126. The remainder of this discussion assumes that a single target application 126 is being tested/debugged, although in some embodiments, multiple applications may be tested and debugged using the techniques described herein.

While the target application 126 is being debugged by the host computer 102, various information is transferred from the processor 122 to the host computer 102. Such information may include trace information. Trace information describes the various activities of the processor 122 as the processor 122 executes the target application 126. The trace information is provided so that a user of the host computer 102 can "step through" the software code of the target application 126 and determine how the processor 122 reacts to each line of code that is executed. Accordingly, the target hardware 104 also includes a trace acquisition module (TAM) 120. The TAM 120 collects trace information output by the processor 122, processes the trace information, and transfers the trace information to the host computer 102 via the cable 107. The host computer 102 is now described.

The host computer 102 comprises a processor 106 coupled to the I/O port 130. The processor 106 also couples to a storage medium 108, one or more output devices 114, one or more input devices 118, and a network port 116. The storage medium 108 may comprise volatile memory (e.g., RAM), non-volatile storage such as ROM, a hard disk, a CD-ROM, a flash drive, a floppy disk, a compact disc, and/or combinations thereof. The storage 108 stores a debugging application 112 and a decoder 110. The decoder 110 comprises a software decoder, although in some embodiments, a hardware decoder coupled to the processor 106 may be used instead. The input devices 118 may include any one or more of a keyboard, mouse, audio input device, touchpad, etc. The output devices 114 may include any one or more of a display, a printer, a storage device (e.g., a hard drive, flash drive), etc. The processor 106 may use the network port 116 to exchange information with another electronic device communicably coupled to the network port 116, such as another computer on an Internet or intranet network connection. For example, the network port 116 may be used to download the debugging application 112 onto the host computer 102.

The debugging application 112 is executed on the processor 106 and is used to test and/or debug the target application 126 on the target hardware 104. More specifically, when the processor 106 executes the debugging application 112, the processor 106 sends signals to and receives signals from the target hardware 104 via the cable 107 and the ports 130 and 128. Signals transferred from the host computer 102 to the target hardware 104 generally comprise test and debug signals, and signals transferred from the target hardware 104 to the computer 102 generally comprise response signals, including trace information. In this way, the target application 126 embedded on the target hardware 104 is tested and debugged using the application 112.

Trace information output by the processor 122 and/or TAM 120 of the target hardware 104 preferably is partitioned into three separate streams of information: a timing stream, a program counter (PC) stream and a data stream. The timing stream contains various timing information associated with the processor 122 as the processor 122 executes the target application 126, such as whether the processor 122 is active or stalled for each processor clock cycle, etc. The PC stream includes various program counter information associated with the processor 122 as the processor 122 executes the target application 126, such as how the program counter is affected by exceptions, branches, etc. The data stream includes various data information associated with the processor 122 as the processor 122 executes the target application 126, such as data values that are accessed by the processor 122, etc. In some embodiments, fewer or more information streams may be used.

Figure 2:
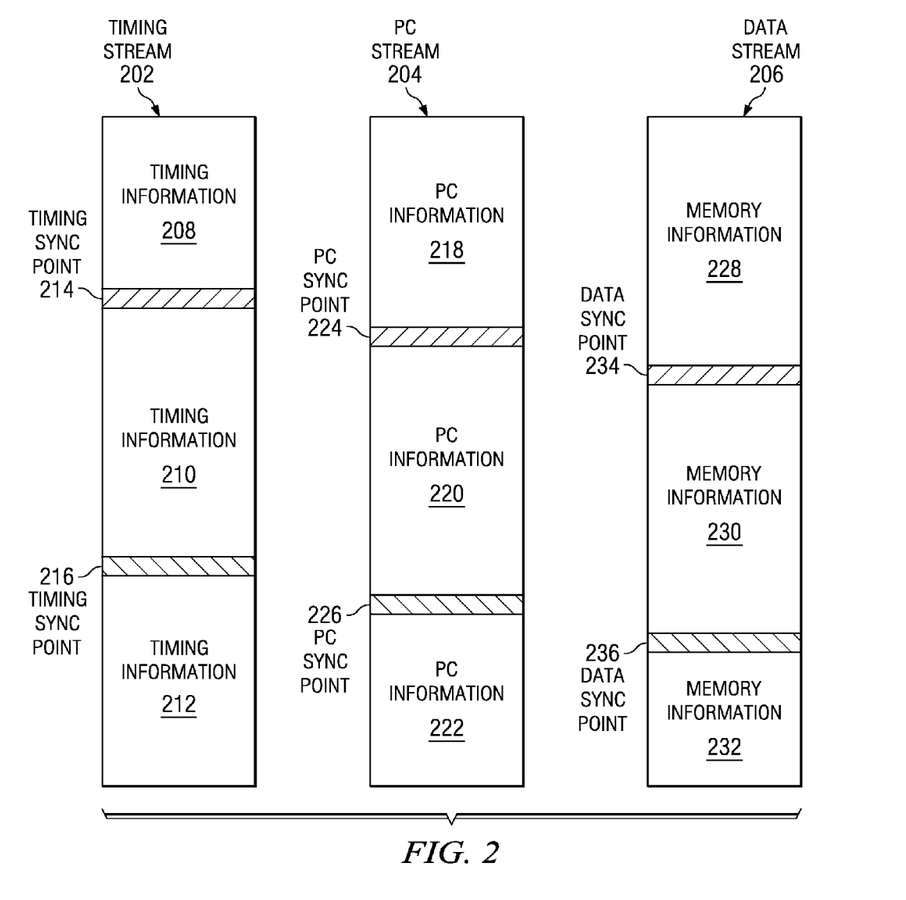
FIG. 2 shows a plurality of trace streams in accordance with embodiments of the invention.

Each information stream includes one or more markers called "synchronization points," or "sync points." In some embodiments, a sync point comprises a packet of information generated by the target hardware 104 and destined for the host computer 102. At least some sync points across the three streams may include a common identifier which is used to synchronize the streams. For example, FIG. 2 shows a timing stream 202, a PC stream 204 and a data stream 206. The timing stream 202 comprises timing data 208 and 210 separated by a timing sync point 214. The timing stream 202 also comprises timing data 212 which is separated from timing data 210 by timing sync point 216. Likewise, the PC stream 204 comprises PC data 218 and 220 separated by PC sync point 224. The PC stream 204 also comprises PC data 222 separated from PC data 220 by PC sync point 226. Similarly, the data stream 206 comprises memory data 228 and 230 separated by data sync point 235. The data stream 206 also comprises memory data 232 separated from memory data 230 by data sync point 236.

In the example provided in FIG. 2, each of these sync points 214, 224 and 234 preferably comprise a common identifier (e.g., one or more common bits). The three streams preferably are synchronized. If, for any reason, the three streams become unsynchronized, the sync points 214, 224 and 234 may be used to re-synchronize the three streams. For instance, assume the three streams are unsynchronized, and the three streams are provided to the TAM 120. The TAM 120 receives the timing sync point 214 first and determines that the timing sync point 214 has an identifier of "1." The TAM 120 then stops the flow of the stream 202 and monitors the PC stream 204 for a sync point that has an identifier of "1." Accordingly, the TAM 120 determines that the PC sync point 224 has an identifier of "1." As such, the TAM 120 also stops the PC stream 204 and monitors the data stream 206 until a sync point having an identifier of "1" is located. When the TAM 120 determines that the data sync point 234 has an identifier of "1," the TAM 120 re-activates the timing and PC streams, thereby synchronizing the three streams with each other. The timing sync point 216, PC sync point 226 and data sync point 236 may be used in a similar manner. Such is an example of one way in which the three streams may be synchronized with each other. The scope of disclosure is not limited to this synchronization technique.

Sync points are useful in various situations, one of which is when a software developer (i.e., user of the debugging application 112) desires to test and/or debug a specific portion of the target application 126. For example, if the developer desires to debug a specific portion of the target application 126, starting sync points (e.g., sync points 214, 224, 234) may be inserted such that the streams are synchronized before information associated with the specific portion of the application 126 appears in the streams. The starting sync points and ending sync points generally are used to indicate a starting point and an ending point of streams containing information that the user of the debugging application 112 desires to trace.

The software code associated with trace information between the boundaries delineated by the starting and ending sync points in the streams may contain one or more branch instructions. Accordingly, the PC stream 204 comprises one or more branch packets (not specifically shown in FIG. 2) which comprise information associated with the branch instructions. A branch packet corresponds to one or more of the branch instructions. For efficiency, each branch packet preferably corresponds to as many as eight branch instructions, although the scope of disclosure is not limited as such.

Figure 3A:
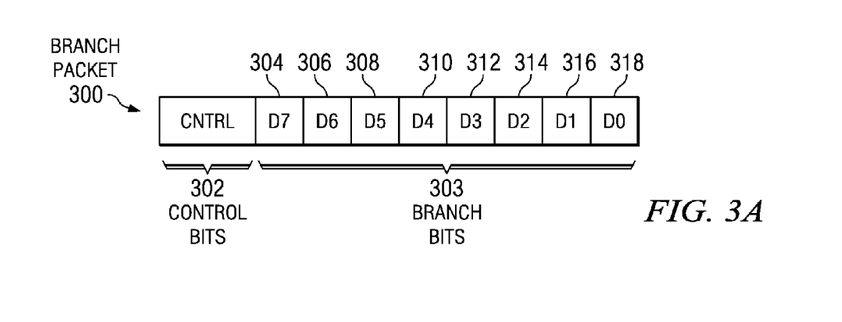
FIGS. 3A-3G show a plurality of branch packets, in accordance with preferred embodiments of the invention.

FIG. 3A shows a branch packet 300. The branch packet 300 comprises control bits 302 and branch bits 303. The control bits 302 contain bits which identify the packet 300 as a branch packet. The branch bits 303 are partitioned into eight bits 304, 306, 308, 310, 312, 314, 316 and 318. Each of these eight bits corresponds to one branch instruction found in software code executed between the starting and ending PC sync points 224 and 226. For purposes of this discussion, bit 304 is the most significant bit and the bit 318 is the least significant bit. As previously mentioned, the scope of disclosure is not limited to using eight bits in each branch packet, and in other embodiments, any number of bits may be used.

For each branch instruction, a branch either is "taken" (i.e., program flow branches to an address specified by the branch instruction) or is "not taken" (i.e., program flow does not branch to an address specified by the branch instruction). If a branch of a branch instruction is taken, the branch bit in the packet 300 that corresponds to the branch instruction is assigned a "1." In other embodiments, a "0" may be assigned for a taken branch. Conversely, if a branch of a branch instruction is not taken, the branch bit in the packet 300 that corresponds to the branch instruction is assigned a "0." In other embodiments, a "1" may be assigned for a branch not taken.

A branch packet generally is not sent (i.e., is not inserted into the PC stream 204) until the packet is full. Because a branch packet 300 preferably corresponds to eight branch instructions, the branch packet 300 is not inserted into the PC stream 204 and sent to the host computer 102 by the TAM 106 until all eight bits corresponding to eight branch instructions are filled. Thus, for example, if only six bits corresponding to six branch instructions are in the branch packet 300, the packet is not sent. However, once the aforementioned branch packet includes two more bits for a total of eight bits, the TAM 106 inserts the packet into the PC stream 204, which is transferred to the host computer 102. The scope of disclosure is not limited to any specific number of bits in the branch packet 300.

Empty bits in a branch packet are considered to be invalid, while assigned bits are considered to be valid. In some cases, a sync point may be issued by the TAM 106 before the TAM 106 has finished filling a current branch packet. Thus, the branch packet, which is in the process of being formed, may contain one or more invalid bits. In such cases, the current branch packet should be inserted into the PC stream 204, regardless of whether the branch bits are full. Accordingly, the TAM 106 "flushes" the invalid bits of the branch packet with a common bit (e.g., all invalid bits are flushed with "0" bits or all invalid bits are flushed with "1" bits). The common bit preferably is the inverse of the most significant, valid bit.

Figure 3B:
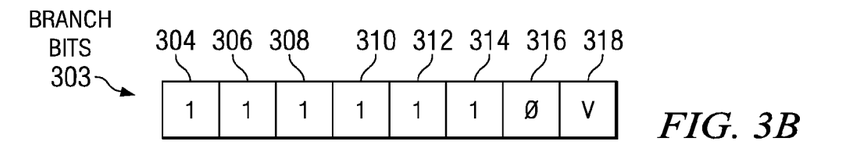
Figure 3C:
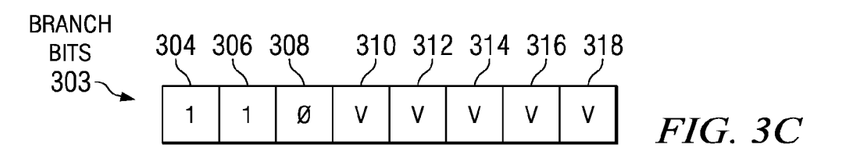
Figure 3D:
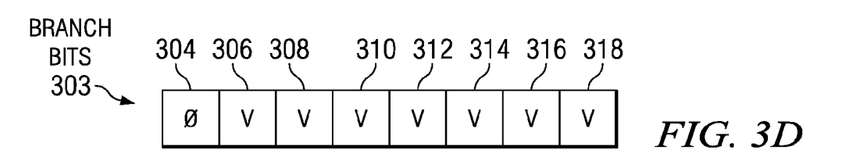

FIGS. 3B-3G illustrate this flushing technique. Referring to FIG. 3B, eight branch bits are shown. The two least significant bits, bits 318 and 316, are valid. The bits 304, 306, 308, 310, 312 and 314 are invalid. Accordingly, the invalid bits are flushed with the inverse of the most significant, valid bit. In this case, the most significant, valid bit is the "0" at bit 316, which may indicate that a branch corresponding to bit 316 is not taken. Thus, the TAM 106 flushes the invalid bits with a common bit of "1." Valid bits marked "V" may be either "0" or "1" but are irrelevant for purposes of this discussion. FIG. 3C shows another example of this flushing technique. As shown in FIG. 3C, the six least significant bits (i.e., bits 308, 310, 312, 314, 316 and 318) are valid, while the remaining two most significant bits are invalid (i.e., bits 304 and 306). The TAM 106 may determine that the most significant, valid bit is bit 308, which is assigned a "0." Accordingly, the TAM 106 flushes the invalid bits 304 and 306 with the common bit of "1." As shown in FIG. 3D, if all bits are valid, then the TAM 106 does not flush any of the bits in the branch packet.

Figure 3E:
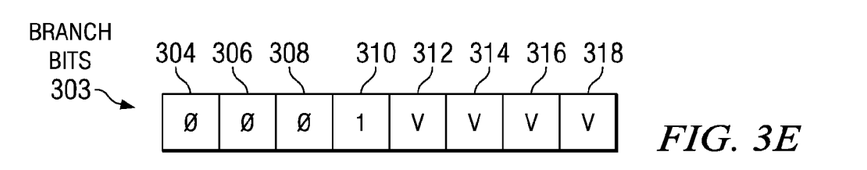
Figure 3F:
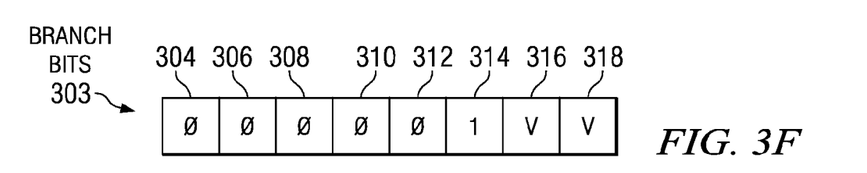
Figure 3G:
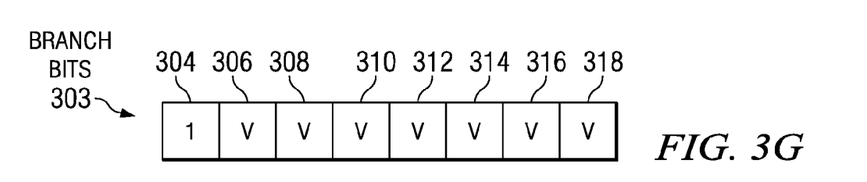

A different flushing scheme also may be used, as shown in FIGS. 3E-3G. Referring to FIG. 3E, the five least significant bits are valid, while the three most significant bits are invalid. The most significant, valid bit is bit 310, which is assigned a "1." Accordingly, the TAM 106 flushes the invalid bits with the common bit of "0." Likewise, as shown in FIG. 3F, the TAM 106 determines that the three least significant bits are valid, while the five most significant bits are invalid. Accordingly, the TAM 106 flushes the five most significant bits with the inverse of the most significant, valid bit. Thus, the TAM 106 flushes the bits 304, 306, 308, 310 and 312 with "0" bits. As shown in FIG. 3G, if all bits are valid, the TAM 106 does not flush any of the bits in the branch packet as there are no invalid bits in the example of FIG. 3G.

As previously mentioned, the TAM 106 flushes a branch packet if the branch packet is not yet full (i.e., contains invalid bits) when a PC sync point is issued. Accordingly, after flushing the branch packet, the branch packet is inserted into the PC stream 204. The placement of the branch packet in the PC stream 204 preferably is before the sync point that caused the TAM 106 to flush the branch packet. For example, referring again to FIG. 2, assume that the TAM 106 issues the sync point 226 while a current branch packet contains invalid bits. Accordingly, as shown in FIG. 4, the TAM 106 flushes the current branch packet 300 as described above and inserts the branch packet 300 into the PC stream 204 before the sync point 226.

Figure 4:
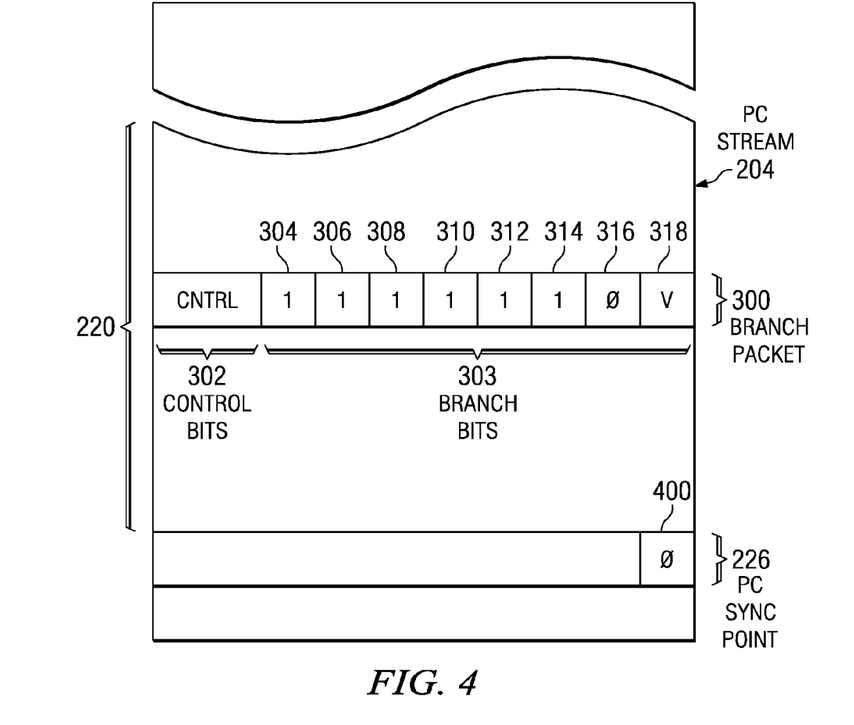
FIG. 4 shows a branch packet and a sync point programmed in accordance with embodiments of the invention.

Still referring to FIG. 4, in addition to flushing the branch packet and inserting the branch packet into the PC stream 204 at a location prior to the sync point 226, the TAM 106 also adjusts the sync point 226 prior to transferring the sync point 226 to the host computer 102. Specifically, the TAM 106 programs the sync point 226 with a branch packet bit 400 which is used as described further below. The branch packet bit 400 preferably is identical to the most significant, valid bit in the branch packet. For example, as shown in FIG. 4, the branch packet 300 comprises two valid branch bits (i.e., bits 316 and 318) and six invalid branch bits. The PC sync point 226 is programmed with a branch packet bit 400 of "0," which is identical to the most significant, valid bit in the branch packet 300 (i.e., bit 316).

As the trace streams are transmitted to the host computer 102, the branch packet 300 and the PC sync point 226 in the PC stream 204 also are transmitted. The decoder 110 receives the information in the trace streams, including the branch packet 300 and the sync point 226. The decoder 110 uses the sync point 226 to determine which branch bits in the branch packet are valid and which branch bits are invalid. More specifically, the decoder 110 determines the status of the branch packet bit 400 in the PC sync point 226. If the branch packet bit is a "0," the decoder 110 searches the preceding branch packet, from the most significant bit to the least significant bit, for the first instance of a "0" bit. The decoder 110 recognizes the first instance of a "0" bit as the first valid bit in the branch packet, and discards the preceding invalid bits. Likewise, if the branch packet bit is a "1," the decoder 110 searches the preceding branch packet, from the most significant bit to the least significant bit, for the first instance of a "1" bit. The decoder 110 recognizes the first instance of a "1" bit in the branch packet as the first valid bit in the branch packet, and the preceding bits as invalid. Thus, the decoder 110 discards the preceding bits and uses the valid bits.

Figure 5:
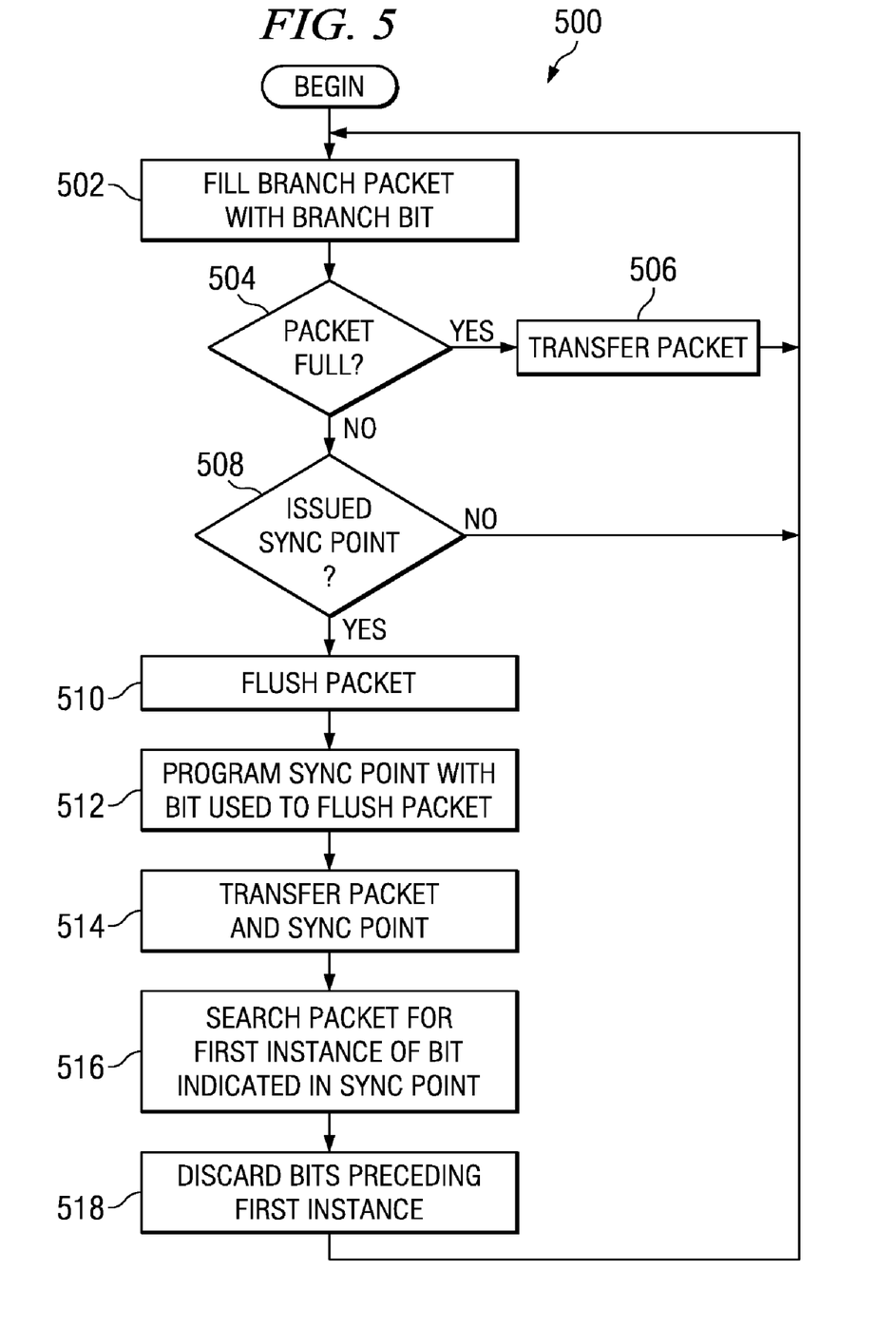
FIG. 5 shows a flow diagram in accordance with embodiments of the invention.

FIG. 5 shows a flow diagram of a method 500 that is implemented in accordance with embodiments of the invention. The method 500 begins with filling a branch packet with branch bits (block 502). The method 500 continues by determining whether the packet is full (block 504). If the packet is full, the method 500 comprises transferring the packet to the host computer (block 506) and resuming at block 502 with a new branch packet. If the packet is not full (block 504), the method 500 comprises determining whether a sync point has been issued (block 508). If not, the method 500 comprises resuming at block 502. However, if a sync point has been issued (block 508), the method 500 comprises flushing the packet (block 510) as described above. The method 500 further comprises programming the sync point with the bit used to flush the packet (block 512) and transferring the packet and the sync point (block 514) to the host computer 102. The method 500 further comprises the host computer receiving and searching the packet for the first instance of the bit indicated in the sync point (block 516) and, once the first instance is found, discarding bits preceding the first instance (block 518). In this way, the invalid bits are discarded. The method 500 then resumes at block 502 with a new branch packet.

The timing stream 202 comprises timing packets. Each timing packet comprises a plurality of bits. Each bit is associated with a different clock cycle of the processor 122 and describes whether the clock cycle is a stall cycle or an active cycle. A stall cycle is a cycle during which the timing stream is active (or "flowing"), but the PC stream is inactive. An active cycle is a cycle during which both the timing and PC streams are active.

Each timing packet preferably comprises eight bits, although the scope of disclosure is not limited as such. The TAM 120 fills a current timing packet with a bit as each clock cycle elapses. As explained, the bit used to fill the current timing packet depends on whether the clock cycle is a stall cycle or an active cycle. As with the branch packets, if the TAM 120 issues a sync point (e.g., a timing sync point or PC sync point) before the current timing packet has been filled with all eight bits, the empty (i.e., invalid) bits in the current timing packet are flushed with a common bit. The common bit is the inverse of the most significant, valid bit in the current timing packet.

Figure 6A:
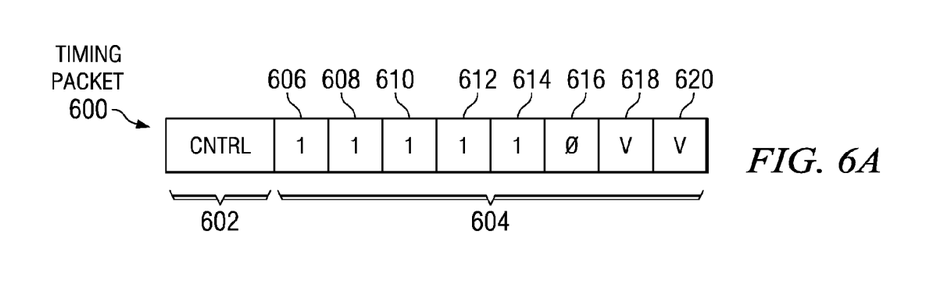
FIGS. 6A and 6B show timing packets programmed in accordance with preferred embodiments of the invention.

For example, as shown in FIG. 6A, a timing packet 600 comprises control bits 602 and timing bits 604. The control bits 602 indicate that the packet is a timing packet. The timing bits 604 preferably comprise eight bits, each bit associated with a clock cycle and indicative of whether the corresponding clock cycle is an active cycle or a stall cycle. In preferred embodiments, a "1" bit indicates a stall cycle and a "0" bit indicates an active cycle. In the Figure, bits 616, 618 and 620 are valid, and bits 606, 608, 610, 612 and 614 are invalid. Bit 620 comprises a "0" because the target system is active during the clock cycle to which the bit 620 corresponds. Bit 618 comprises a "1" because the target system is stalled during the clock cycle to which the bit 618 corresponds.

Sync points preferably are issued by the TAM 120 when the system is active. Accordingly, the most significant, valid bit in the timing packet 600 is an active bit of "0" at bit 616, since this bit is assigned when the sync point is issued by the TAM 120. The TAM 120 flushes bits 606, 608, 610, 612 and 614 with a common bit of "1," which is the inverse of the most significant, valid bit "0" at bit 616. Once the timing packet 600 is flushed, the TAM 120 inserts the timing packet 600 into the timing stream 202, e.g., between sync points 214 and 216. The timing packet 600 and the sync points then are transferred to the host computer 102.

Figure 6B:
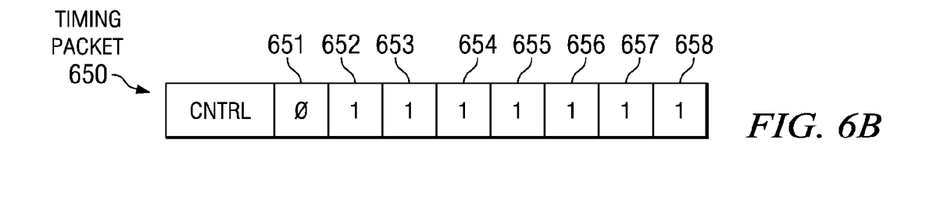

The decoder 110 uses sync points which arrive after the packet 600 to determine which bits in the packet 600 are valid and which bits are invalid. The decoder 110 is programmed to determine that when a timing packet is received, the first instance of a "0" bit is the first valid bit in the packet, since sync points are issued on active (i.e., "0" bit) cycles. Any bits in the packet 600 preceding the first instance of a "0" bit are invalid. Accordingly, the decoder 110 searches the packet 600, from the most significant bit to the least significant bit, for the first instance of a "0" bit. The decoder 110 finds the first "0" bit at bit 616, and determines that bits 616, 618 and 620 are valid, while the preceding bits 606, 608, 610, 612 and 614 are invalid. The decoder 110 may use the valid bits and discard the invalid bits. A binary scheme different from that described above also may be used (e.g., in which "0" bits are exchanged for "1" bits). Further, different flushing schemes also may be used when the target system is in standby mode (i.e., when the timing stream 202 is active but the PC stream 204 is inactive). For example, referring to FIG. 6B, timing packet 650 comprises bits 651-658, where bit 651 is the most significant bit and bit 658 is the least significant bit. In standby mode, valid bits contain "1" bits, while invalid bits contain "0" bits. Thus, bits 652-658 are valid, while bit 651 is invalid. The decoder 110 receives the timing packet 650 and searches the packet 650 for the first instance of a "1" bit. As such, the decoder 110 determines that the bit 651 is invalid, and that bits 652-658 are valid. The decoder 110 may discard the invalid bit 651.

Figure 7:
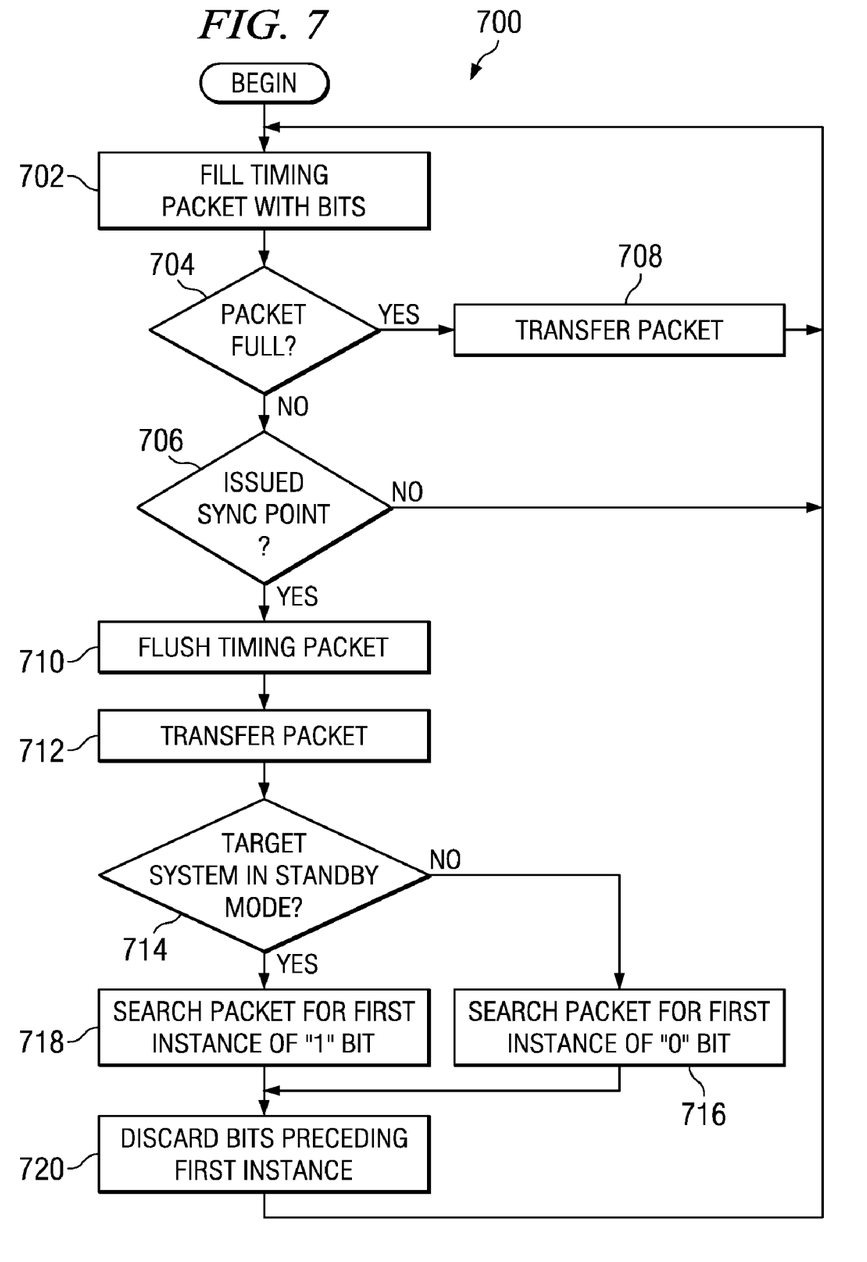
FIG. 7 shows another flow diagram in accordance with embodiments of the invention.

FIG. 7 shows a flow diagram of a method 700 implemented in accordance with embodiments of the invention. The method 700 begins by filling a timing packet with timing bits (block 702). The method 700 further comprises determining whether the packet is full (block 704). If the packet is full, the method 700 comprises transferring the packet to the host computer 102 (block 708) and resuming at block 702 with a new timing packet. If the packet is not full (block 704), the method 700 comprises determining whether a sync point has been issued (block 706). If not, the method 700 comprises resuming at block 702. However, if a sync point has been issued (block 706), the method 700 comprises flushing the timing packet (block 710) as described above. The method 700 further comprises transferring the packet to the host computer 102 (block 712). If the target system is in standby mode when the timing packet is flushed (block 714), the method 700 comprises searching the packet for the first instance of a "1" bit (or, in other embodiments, a "0" bit) (block 718). If the target system is not in standby mode when the timing packet is flushed (block 714), the method 700 comprises searching the packet for the first instance of a "0" bit (or, in other embodiments, a "1" bit) (block 716). In either case, the method 700 further comprises discarding the bits preceding the first instance (block 720) and resuming at block 702 with a new timing packet.

The scope of disclosure is not limited to the views described above. Numerous variations and modifications will become apparent to those skilled in the art once the above disclosure is fully appreciated. It is intended that the following claims be interpreted to embrace all such variations and modifications.

What is claimed is:

1. A system, comprising:
    a processor adapted to execute software code comprising branch instructions; and
    a trace logic coupled to the processor being operable to trace execution of a sequence of software instructions and adapted to generate a branch packet comprising a consecutives sequence of branch bits for representing whether corresponding branch instructions in the sequence of software instructions occurring between two trace synchronization points were taken or not taken, wherein an assigned branch bits in the consecutive sequence of branch bits is a valid branch bit having a value that indicates whether the corresponding branch instruction was taken or not taken and an unassigned branch but in the consecutive sequence of branch bits is an invalid branch bit; and
    wherein the trace logic further operable to store a selected value in one or more unassigned branch bits in the consecutive sequence of branch bits to indicate that the one or more unassigned branch bits are invalid when a trace synchronization point is issued before all branch bits in the branch packet are assigned, wherein the selected value indicating an invalid bit is selected to be a different value than a most significant valid branch bit; and port circuitry coupled to the trace logic being operable to output the branch packet to a test host processor.

2. The system of claim 1, wherein the valid branch bit indicates a branch taken by a first bit value and indicates a branch not taken by an alternate bit value.

3. The system of claim 1, wherein a test host processor coupled to said processor discards invalid branch bits.

4. The system of claim 1, wherein a test host processor coupled to said processor searches the branch packet, from a most significant bit to a least significant bit, for a first instance of a branch bit that corresponds to a valid branch bit.

5. A method, comprising:
receiving a branch packet comprising a consecutive sequence of branch bits, wherein some branch bits in the consecutive sequence of branch bits are assigned branch bits, wherein an assigned branch bit is a valid branch bit having a bit value indicating whether a corresponding branch instruction in a sequence of instruction executed between trace synchronization points was taken or not taken, and wherein all other branch bits in the consecutive sequence of branch bits are empty branch bits in which each empty branch bit has a bit value indicating that the empty branch bit is invalid, wherein one or more consecutive empty branch bits have a common bit value that is an inverse of a most significant, valid branch bit value in the branch packet;
receiving a second packet with an indication of a bit value of a most significant valid branch bit in the sequence of bits; and
searching said branch packet from a most significant branch bit to a least significant bit for a first instance of the valid branch bit value.

6. The method of claim 5, further comprising discarding branch bits more significant that said first instance of the valid branch bit value.

7. The method of claim 5 further comprising discarding empty branch bits.

8. A computer storage medium comprising computer program code stored therein which, when executed by a processor, causes the processor to:
receive a branch packet and a trace synchronization packet, said branch packet comprising a consecutive sequence of branch bits for representing whether corresponding branch instructions occurring between two trace synchronization points were taken or not taken in a sequence of software instruction executed on another processor and said trace synchronization packet comprising an indicator bit having a bit value of a most significant assigned branch bit in the branch packet;
search through the branch packet for a first instance of said indicator bit; and
discard branch bits in the branch packet that are more significant than said first instance of the indicator bit;
wherein at least some of the branch bits in the consecutive sequence of branch bits are assigned branch bits having a bit value indication whether the corresponding branch instruction was taken or not taken, and wherein all other branch bits in the consecutive sequence of branch bits are unassigned branch bits having a bit value indicating the branch bit is invalid.

9. The computer storage medium of claim 8, wherein the software causes the processor to search through the branch from a most significant branch bit toward a least significant branch bit.

10. The computer storage medium of claim 8, wherein said discarded bits comprise unassigned bits.

11. A method for transferring traced branch information, comprising:
tracing execution of a sequence of software instructions;
generating a branch packet comprising a consecutive sequence of branch bits for representing whether corresponding branch instruction in the sequence of software instruction occurring between two trace synchronization points were taken of not taken, wherein an assigned branch bit in the consecutive sequence of branch bits is a valid branch bit having a value that indicates whether the corresponding branch instruction was taken or not taken and an unassigned branch bit in the consecutive sequence of branch bits is an invalid branch bit;
when a trace synchronization point is issued before all branch bits in the branch packet are assigned, storing a selected value in one or more consecutive unassigned branch bits in the consecutive sequence of branch bits to indicate that the one or more unassigned branch bits are invalid, wherein storing the selected value comprises selecting a value to be a different value than a most significant valid branch bit;
generating an indicator packet with an indicator of the selected value; and
transferring the branch packet and the indicator packet to a test host processor.

12. The method of claim 11, wherein a valid branch bit indicates a branch taken by a first bit value and indicates a branch not taken by an alternate bit value.

* * * * *